(12) United States Patent
Clift

(10) Patent No.: US 10,834,473 B2
(45) Date of Patent: Nov. 10, 2020

(54) TELEVISION RECEIVER APPLICATION FOR TV AND ELECTRONIC DEVICES

(71) Applicant: SONY CORPORATION, Tokyo (JP)

(72) Inventor: Graham Clift, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/199,113

(22) Filed: Nov. 23, 2018

(65) Prior Publication Data

US 2020/0169792 A1 May 28, 2020

(51) Int. Cl.
*H04N 21/63* (2011.01)
*H04N 21/643* (2011.01)
*H04N 21/647* (2011.01)
*H04H 20/10* (2008.01)

(52) U.S. Cl.
CPC ........ *H04N 21/631* (2013.01); *H04H 20/106* (2013.01); *H04N 21/64322* (2013.01); *H04N 21/64707* (2013.01)

(58) Field of Classification Search
None
See application file for complete search history.

(56) References Cited

U.S. PATENT DOCUMENTS

2018/0007307 A1* 1/2018 Walker ................... H04H 60/19
2019/0166326 A1* 5/2019 Park ................... H04N 5/44513

FOREIGN PATENT DOCUMENTS

EP  3 364 659 A1  8/2018
WO  WO 2017/150937 A1  9/2017

OTHER PUBLICATIONS

International Search Report and Written Opinion of the International Searching Authority dated Feb. 4, 2020 in PCT/IB2019/060003, 13 pages.

* cited by examiner

*Primary Examiner* — Hsiungfei Peng
*Assistant Examiner* — Fred Peng
(74) *Attorney, Agent, or Firm* — Oblon, McClelland, Maier & Neustadt, L.L.P.

(57) ABSTRACT

An information processing apparatus includes processing circuitry configured to issue a first command, via an application programming interface (API), that instructs a tuner device to tune to a RF channel of a broadcast stream. In response to reception of an indication from the tuner device that the RF channel is acquired, and the received indication specifies a signal type of the acquired RF channel is a first predetermined type of signal, the processing circuitry is further configured to (i) issue a second command that instructs the tuner device to identify each physical layer pipe (PLP) in the broadcast stream that includes low level signaling (LLS) tables, (ii) issue a third command that instructs the tuner device to select up to a predetermined number of PLPs from the identified PLPs and send data packets from the selected PLPs to the processing circuitry, and (iii) process the data packets.

19 Claims, 14 Drawing Sheets

PLP #1*

PLP #2

PLP #3*

PLP #4*

PLP #5

PLP #6*

FIG. 9

TELEVISION RECEIVER APPLICATION FOR TV AND ELECTRONIC DEVICES

BACKGROUND

Technical Field

The present disclosure relates generally to an application for implementing additional television broadcast receiver functionality in TV and electronic devices.

Description of the Related Art

ATSC 3.0 is a new Digital Television (DTV) standard that offers support for newer technologies. An important feature of the ATSC 3.0 standard is that the delivery of Internet Protocol (IP) packets over the broadcast emission for both signaling as well as content, with the design goal that protocols used are as close as possible to those used in the Internet. As a benefit of this approach, the ATSC 3.0 standards support over-the-top (OTT) delivery of TV content and signaling as an adjunct to content delivered via the broadcast path. OTT delivery may include the delivery of television content through the user's broadband internet connection. "Hybrid" services are possible in which some components are delivered by broadcast and others (e.g., additional audio language or web-based application content) are delivered via broadband.

Some broadcasting stations have developed applications, which provide specialized content for viewing on mobile devices, typically smartphones and tablets. This specialized content may be distributed from a server, or server system, by way of unicast transmission (i.e., one-to-one). Although platforms such as smartphones and tablets can have applications installed for video streaming, and larger screen computers such as laptops and desktops can view video streaming through a Web browser, there is a need to develop an implementation of ATSC 3.0 receiver functionality within these types of electronic devices.

SUMMARY

According to an embodiment of the present disclosure, there is provided an information processing apparatus that includes a communication interface configured to connect to a tuner device. The information processing apparatus includes processing circuitry configured to: (a) issue a first command, via an application programming interface (API) that enables communication between the processing circuitry and the tuner device across the communication interface, that instructs the tuner device to tune to a RF channel of a broadcast stream, (b) in response to reception of an indication from the tuner device that the RF channel is acquired, and the received indication specifies a signal type of the acquired RF channel is a first predetermined type of signal, (i) issue a second command, via the API, that instructs the tuner device to identify each physical layer pipe (PLP) in the broadcast stream that includes low level signaling (LLS) tables, (ii) issue a third command, via the API, that instructs the tuner device to select up to a predetermined number of PLPs from the identified PLPs and send data packets from the selected PLPs to the processing circuitry, and (iii) process the data packets to retrieve signaling content and content of a television service.

According to an embodiment of the present disclosure, there is provided a tuner device that includes a communication interface configured to connect to an information processing apparatus. The tuner device further includes processing circuitry configured to (a) receive a first command from the information processing apparatus, via an application programming interface (API) that enables communication between the information processing apparatus and the tuner device across the communication interface, that instructs the tuner device to tune to a RF channel of a broadcast stream, (b) in response to a determination that the RF channel is acquired and is a first predetermined type of signal, (i) send to the information processing apparatus via the API an indication that specifies the signal type of the acquired RF channel as the first predetermined type of signal, (ii) receive a second command, from the information processing apparatus via the API, that instructs the tuner device to (a) identify each physical layer pipe (PLP) in the broadcast stream that includes low level signaling (LLS) tables and (b) send a list including each identified PLP that includes LLS table to the information processing apparatus via the API, and (iii) receive a third command, from the information processing apparatus via the API, that instructs the tuner device to select up to a predetermined number of PLPs from the identified PLPs and send data packets from the selected PLPs to the information processing apparatus.

According to an embodiment of the present disclosure, there is provided a non-transitory computer-readable medium storing instructions, which when executed by a processor in an information processing apparatus, cause the processor to perform a method that includes issuing a first command, via an application programming interface (API) that enables communication between the information processing apparatus and a tuner device across a communication interface, that instructs the tuner device to tune to a RF channel of a broadcast stream. In response to reception of an indication from the tuner device that the RF channel is acquired, and the received indication specifies a signal type of the acquired RF channel is a first predetermined type of signal, the method further includes (i) issuing a second command, via the API, that instructs the tuner device to identify each physical layer pipe (PLP) in the broadcast stream that includes low level signaling (LLS) tables, (ii) issuing a third command, via the API, that instructs the tuner device to select up to a predetermined number of PLPs from the identified PLPs and send data packets from the selected PLPs to the processing circuitry, and (iii) processing the data packets to retrieve signaling content and content of a television service.

According to an embodiment of the present disclosure, there is provided a non-transitory computer-readable medium storing instructions, which when executed by a processor in a tuner device, cause the processor to perform a method that includes receiving a first command from an information processing apparatus, via an application programming interface (API) that enables communication between the information processing apparatus and the tuner device across a communication interface, that instructs the tuner device to tune to a RF channel of a broadcast stream. In response to a determination that the RF channel is acquired and is a first predetermined type of signal, the method further includes (i) sending to the information processing apparatus via the API an indication that specifies the signal type of the acquired RF channel as the first predetermined type of signal, (ii) receiving a second command, from the information processing apparatus via the API, that instructs the tuner device to (a) identify each physical layer pipe (PLP) in the broadcast stream that includes low level signaling (LLS) tables and (b) send a list including each identified PLP that includes LLS table to the information processing apparatus via the API, and (iii) receiving a third command, from the information processing apparatus via the API, that instructs the tuner device to select up to a predetermined number of PLPs from the identified PLPs and send data packets from the selected PLPs to the information processing apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9. illustrates exemplary physical layer pipes (PLPs).

DETAILED DESCRIPTION

Figure 1:
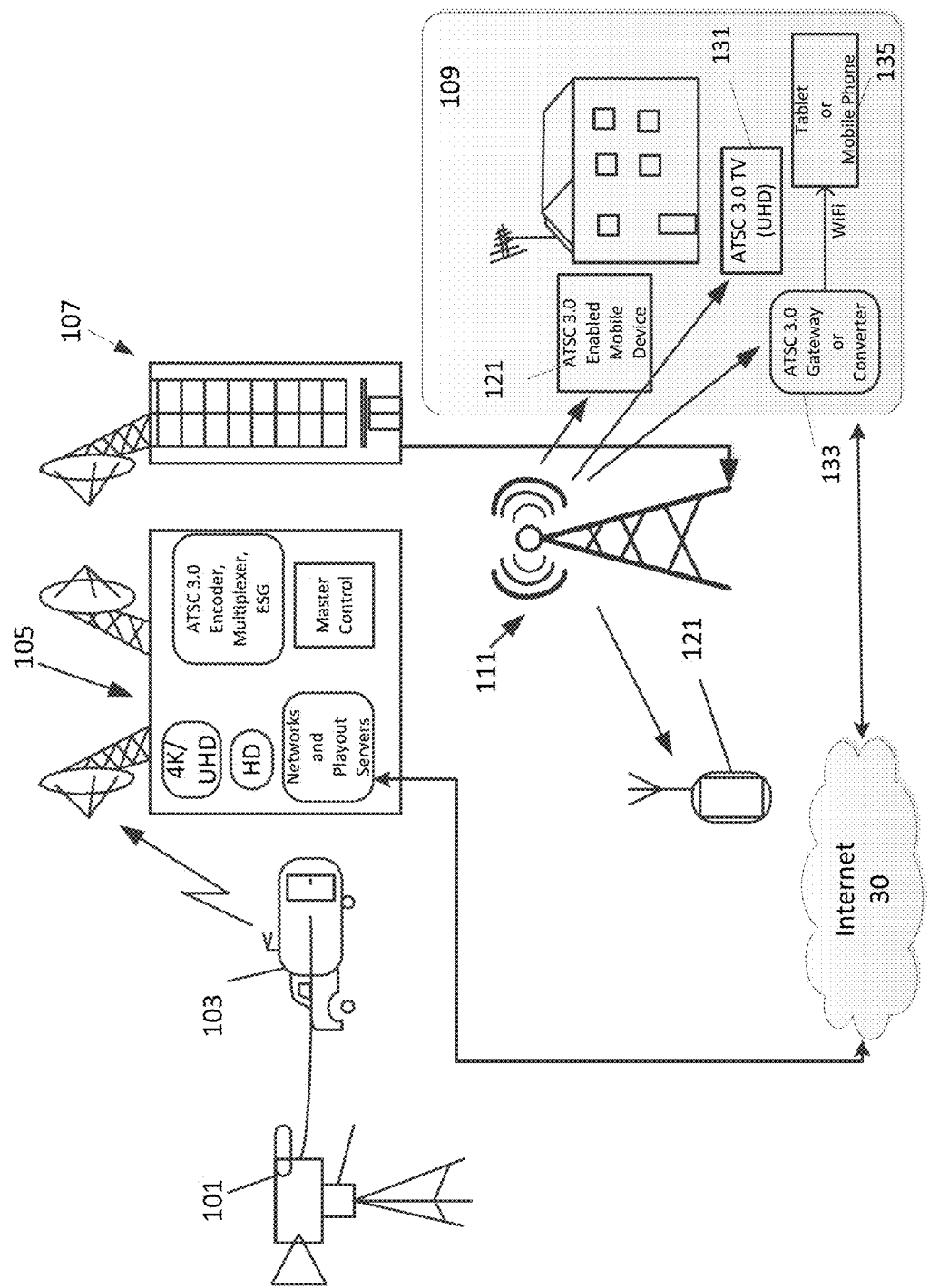
FIG. 1 is a schematic that shows basic components of a DTV system based on ATSC 3.0 standards.

Referring now to the drawings, wherein like reference numerals designate identical or corresponding parts throughout several views, the following description relates to an ATSC receiver that may be implemented in an information processing apparatus without a built-in tuner/demodulator, as in the case of a television. In certain embodiments, the information processing apparatus is an Android device such as a smartphone, tablet, or other consumer electronic devices (such as a set-top box) that operates with a dedicated Android application used in conjunction with a hardware add-on in the form of a tuner device.

Each of the functions of the described embodiments may be implemented by processing circuitry, which includes one or more processing circuits. A processing circuit includes a programmed processor. In described embodiments, the programmed processor is an Advanced Reduced Instruction Set Computer (RISC) Machine (ARM) processor commonly found in Android-based smartphones and tablet computers that run the Android operating system. A processing circuit may also include devices such as an application specific integrated circuit (ASIC) and conventional circuit components arranged to perform the recited functions. Note that circuitry refers to a circuit or system of circuits. Herein, the circuitry may be in one computer system or may be distributed throughout a network of computer systems.

In the present disclosure, Android is a mobile operating system maintained by Google LLC. and was designed primarily for touchscreen devices such as tablets and smartphones. Application software runs on an application framework which includes a Java library based on Open JDK. In the present disclosure, the version of USB used may be either USB 2.0 or USB 3.0, which can accommodate a data transfer speed of up to 5 Gbit/s. First, a description is provided of a basic architecture of a broadcast television system based on ATSC 3.0.

Embodiments of the present disclosure are directed to implementing ATSC functionality in electronic devices such as a smartphone, tablet, laptop, etc. These types of devices are considered as non-TV devices because while these devices can stream content, they do not have the capability to tune to a television broadcast without additional hardware and software.

Providing ATSC TV functionality in an electronic device provides many significantly advantageous features. For example, when a user interacts with an ATSC DTV receiver, whether implemented in a regular DTV set or within a different device such as a smartphone or tablet, they may select a "service" for viewing.

In some embodiments, an ATSC "service" is a collection of media components and/or metadata delivered to receivers in aggregate. Components may be of multiple media types. A service may be either continuous or intermittent. A service can be Real Time or Non-Real Time, where Real Time service can include a sequence of TV Programs.

In ATSC 3.0, a service can be an application that may or may not have live broadcast streaming audio/video content. A service may also include non-real-time content such as video-on-demand, or other interactive content like one might find on a web page. Also some or all components of an ATSC 3.0 service may be delivered via the broadband (internet) path. A service that includes components from both broadcast and broadband is called a "hybrid" service.

FIG. 1 is a diagram showing an arrangement of basic components for an ATSC 3.0 system. Video technology is moving from High Definition (HD) digital television to advanced technologies, including video in 4K (a.k.a UHD) and 8K horizontal resolution, High Dynamic Range (HDR), wide color gamut, and high frame rate. Subsequently, the ATSC 3.0 system may include a digital video camera 101 that can capture Ultra High Definition (UHD) video, possibly remotely in conjunction with a mobile transmission unit 103 that provides a signal for a TV station 105. The TV station 105 includes, among other things, facilities for television production and broadcast control. Using ATSC 3.0, an encoder and multiplexer may generate IP packets for a television broadcast. The television broadcast may be transmitted with an Electronic Program Guide (EPG) to one or more transmitter sites 107. An ATSC 3.0 transmitter site may include an ATSC 3.0 waveform transmitter that transmits radio frequency (RF) signals via a tower transmit antenna 111. The ATSC 3.0 waveform may be picked up in a home, office building, library, shop or restaurant 109 by an ATSC 3.0 TV 131, an ATSC 3.0 Gateway or Converter 133, or an ATSC 3.0 enabled mobile device 121. A tablet or smartphone 135 may obtain the broadcast signal as a WiFi signal provided from the Gateway or Converter. Alternatively, outside a place of business or a home, Tablets, smartphones or other mobile devices 121 may pick up the broadcast waveform from a tower transmit antenna 111. Such mobile devices 121 may be used within a personal vehicle or within a mode of public transportation. Furthermore, the ATSC 3.0 Gateway and Networks and Playout Servers in TV station 105 may communicate with each other via Internet 30.

Mobile operating systems, such as the Android operating system developed by Google LLC or the iOS operating system developed by Apple Computer, are operating systems for phones, tablets, smartwatches, or other mobile devices and include features for mobile or handheld use. For example, mobile devices may include mobile features of cellular communication, Global Positioning System (GPS) navigation, video and/or single frame cameras, speech recognition, and typically a touchscreen. Examples of other mobile operating systems include Tizen, Windows 10 Mobile, etc. In particular, the Android operating system has been designed primarily for touchscreen devices. Typically, application software for the Android operating system runs on an application framework which includes a Java library based on Open JDK (Java Development Kit).

In the present disclosure, a DTV broadcaster, or simply broadcaster as used herein, relates to a local television station that transmits content via radio waves as a terrestrial television transmission.

An ATSC 3.0 system has a layered architecture defined as a physical layer, protocols layer, management layer, and applications and presentation layer. Details of the ATSC 3.0 system is found in, for example, ATSC Standard: ATSC 3.0 System (Doc. A/300:2017, dated Oct. 19, 2017), the entire contents of which are incorporated by reference. At the transmitter side, the system architecture for an RF channel may include at least the following four main parts: Input Formatting, Bit Interleaved and Coded Modulation (BICM), Framing and Interleaving, and Waveform Generation. In the Input formatting and BICM parts, the Physical Layer Pipe (PLP) is a stream of data encoded with a specific modulation, code rate and length. There may be only a single PLP for an RF channel. The maximum number of PLPs in each RF channel is 64. The input formatting part formats input data packets into output packets called ATSC Link Layer Protocol (ALP) packets. The length of each ALP packet is variable. The input formatting part maps the ALP packets to Baseband Packets, which include at least a header and a payload containing ALP packets. Baseband packets have fixed length, with the length determined by the outer code type, inner code rate and code length chosen for the target PLP.

ATSC Standard A/322—Physical Layer Protocol, dated Jun. 6, 2017, herein incorporated by reference in its entirety, specifies the ATSC 3.0 physical layer protocol. As described in A/322, a broadcaster may choose one of several time interleaver modes for the delivery of any given PLP. These modes include no time interleaving, Convolutional Time Interleaving (CTI), and Hybrid Time Interleaving (HTI). Due to practical constraints on its design, for a receiver to process any PLP that uses CTI interleaver mode, all of its processing resources must be used. In contrast, for PLPs that use HTI interleaver mode, a practical receiver has sufficient resources to be able to process four such PLPs in parallel.

In the ATSC 3.0 system, protocols were chosen to be aligned with standards developed for the internet and worldwide web, especially considering that ATSC 3.0 also supports "over the top," (OTT) or broadband delivery, of signaling and content. Hybrid services are also possible, in which some components are delivered via the broadcast path while others (for example interactive content or an alternative audio track) are delivered via broadband servers operated by the broadcaster.

An aspect of the present disclosure is a television receiver application that is configured to provide TV functionality in an electronic device. The television receiver application can be configured to receive ATSC 3.0 services, for example. The television receiver application may be implemented, for example, as a native Android application that has been built on top of the Android OS. The television receiver application may be written in a high-level programming language such as C/C++ and compiled for the hardware environment of a personal computer, or it may be written in the Java programming language for better portability to other hardware running the Android operating system (such as tablets, phones, or set-top boxes).

In some embodiments, the television receiver application is an ATSC 3.0 Android Application that the user downloads from the Google Play Store and launches to enjoy ATSC 3.0 TV receiver functionality. The television receiver application can detect the presence or absence of an ATSC 3.0 tuner device. If the device is connected, the television receiver application offers the user the option of allowing the television receiver application to access and use the device. If absent, the television receiver application may describe to the user the hardware device that is needed to be purchased or installed to be able to watch broadcast TV via the television receiver application.

If a tuner device is connected, the television receiver application may communicate with the tuner device to: (i) select an RF channel for tuning; (ii) if an ATSC 3.0 (or ATSC 1.0) broadcast emission is found on the selected RF frequency, provide an indication of the signal strength; (iii) receive ATSC Link-Layer Protocol (ALP) packets (see ATSC Standard: Link-Layer Protocol (A/330), Doc. A/330: 2016, dated Sep. 19, 2016, herein incorporated by reference in its entirety) from the tuned frequency, if it is an ATSC 3.0 signal; (iii) receive MPEG-2 Transport Stream packets (see ATSC A/53: ATSC Digital Television Standard, Parts 1-6, 2007, dated Jan. 3, 2007, herein incorporated by reference in its entirety), if it is an ATSC 1.0 signal; and (iv) select up to four PLP (Physical Layer Pipes) for processing. In some embodiments PLPs are data structures for carrying a data payload. Multiple PLPs can be used to carry different streams of data, all of which may be required to assemble a complete delivered product. In addition, data streams required to assemble multiple delivered products can share PLPs if those data streams are to be carried at the same levels of robustness.

The television receiver application may also (i) further support a channel scan operation (as part of user initial setup, or at a later time) so that a full map of available services can be determined and saved; (ii) incorporate the necessary processing of ATSC 3.0 transport signaling; (iii) offer the user the navigation experience to be able to choose the ATSC 3.0 service of interest (this includes Electronic Service Guide displays); (iv) implement fast channel change; (v) manages all resources (beyond the tuner), including volatile and non-volatile memory, user input, and screen/display real estate; (vi) implement the ATSC 3.0 Interactive Services (application runtime) environment defined by ATSC Standard A/344—ATSC 3.0 Interactive Content, dated Dec. 18, 2017, herein incorporated by reference in its entirety; and (vi) implement user features such as PVR functionality, including record, play back, pause live TV, rewind, stop, and fast-forward a recorded program, as well as performing similar functions for live programs. Details of an ATSC 3.0 DTV receiver are next described.

Figure 2:
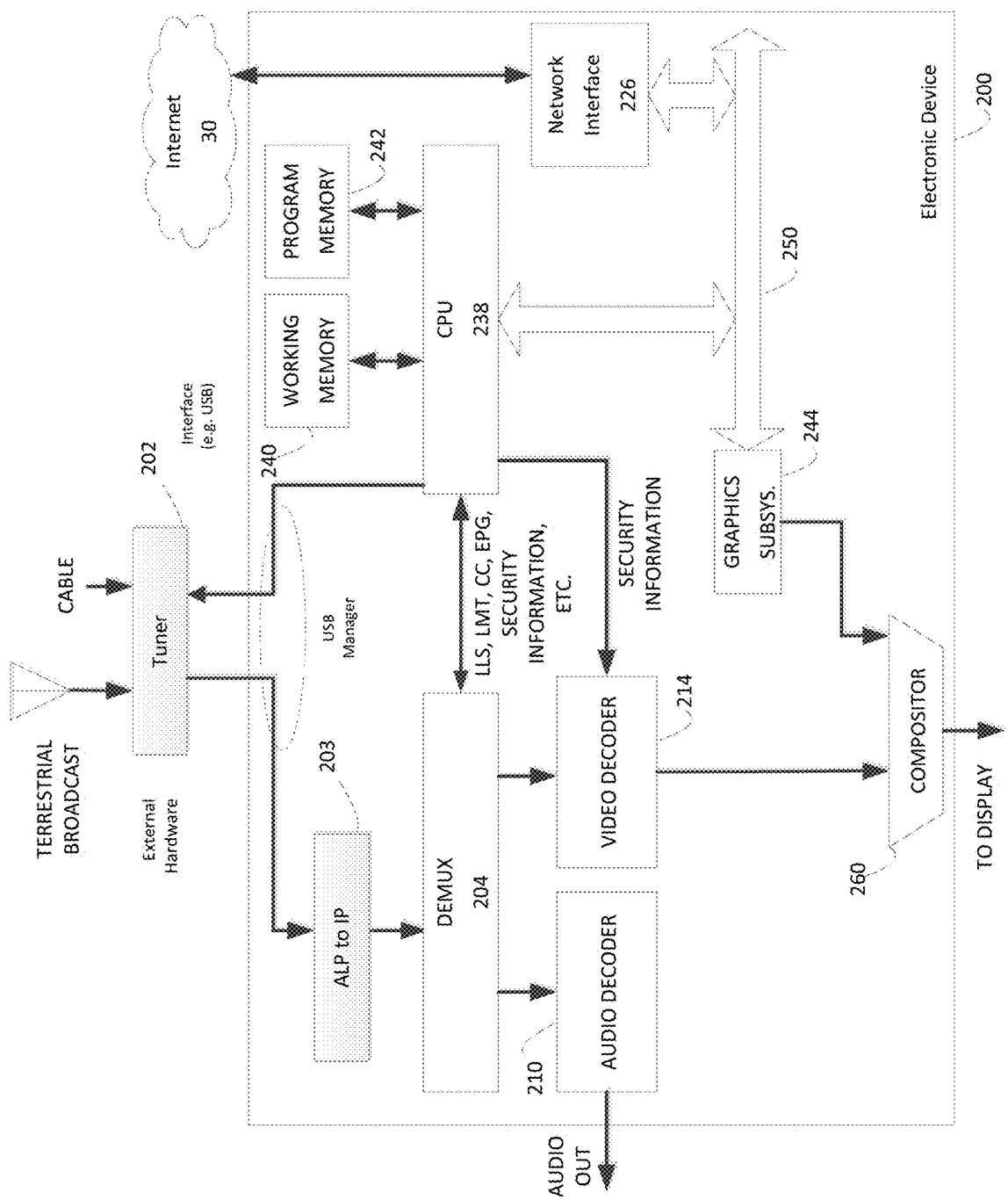
FIG. 2 illustrates an exemplary electronic device.

FIG. 2 illustrates an exemplary electronic device 200, which is configured to access television content and applications via a tuner device (e.g., including a tuner/demodulator) 202 that is configured to connect to the electronic device 200 via a USB. The tuner device 202 connects to the electronic device 200 via other wireless (e.g., WiFi) or wired interfaces in other embodiments. The electronic device 200 may be a fixed device such as a set top box or a mobile or portable device such as a smartphone, tablet computer, laptop, or portable computer.

The tuner device 202 includes receiver circuitry that is configured to receive a data stream (e.g., a broadcast stream) from one or more service providers. The electronic device 200 includes processing circuitry that is configured to perform various functions to operate the electronic device as a television. In one embodiment, a tuner device 202 receives broadcast emissions containing the broadcast stream. The tuner device 202 is configured to receive a data stream that is forwarded via a USB interface to an ALP to IP packet converter 203. IP packets output from the converter 203 may be demultiplexed by the demultiplexer 204 or handled by middleware and separated into audio and video (A/V) streams. The audio is decoded by an audio decoder 210 and the video is decoded by a video decoder 214.

The electronic device 200 generally operates under control of at least one processor, such as the CPU 238, which is coupled to a working memory 240, program memory 242, and a graphics subsystem 244 via one or more buses (e.g., bus 250). The graphics outputted by the graphics subsystem 244 are combined with video images by the compositor and video interface 260 to produce an output suitable for display on a video display.

The CPU 238 operates to carry out functions of the electronic device 200 including executing script objects (control objects) contained in a broadcaster application (e.g., HTML5 application) using for example an HTML5 User Agent stored in the program memory 242, and other types of broadcaster applications such as one or more native broadcaster applications.

In one embodiment, the collection of files making up the broadcaster application can be delivered over broadcast as packages, via the ROUTE protocol described in ATSC Standard A/331—Signaling, Delivery, Synchronization, and Error Protection, dated Dec. 6, 2017, for example and incorporated by reference in its entirety. An exemplary broadcaster application framework is described in ATSC A/344.

Figure 3:
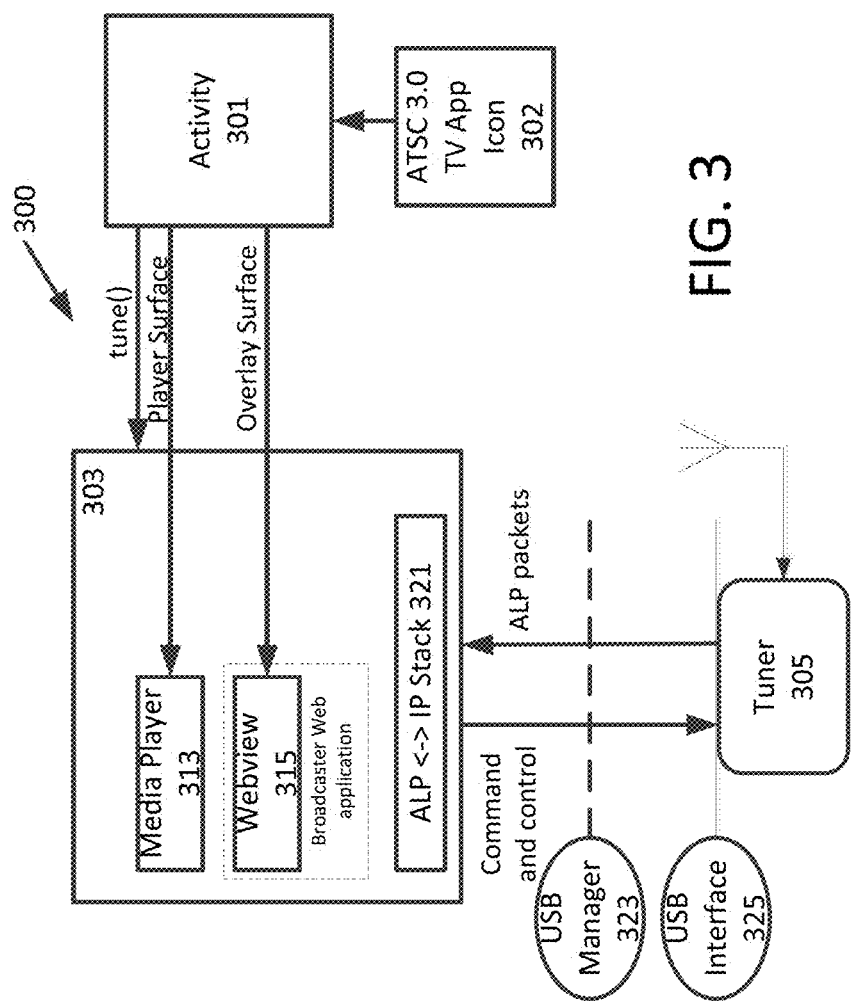
FIG. 3 is a block diagram for an exemplary ATSC 3.0 Receiver.

FIG. 3 is a block diagram of an embodiment of an electronic device 300 having a television receiver application 303 such as an ATSC 3.0 television receiver application in an electronic device. The electronic device 300 includes an associated Android activity 301 component. When the user activates the television receiver application 303 in the electronic device 300, by selecting the "TV" input or by selecting, for example, an "ATSC 3.0 TV" icon 302 from an application tray, the activity 301 is launched. By that time, the television receiver application 303 is already running, and would have collected IP packets from the RF channel that is tuned to by a tuner device 305 if connected to the electronic device 300. Furthermore, the television receiver application 303 may also have the ability to begin retrieving audio, video, and caption packets from the broadcast and have them sent to media player 313 for decoding and rendering. The media player 313 may be an application level media player for Android, such as ExoPlayer. The media player 313 may also support Dynamic Adaptive Streaming over HTTP (DASH) and Common Encryption.

The activity 301 component can accept user input from a remote control unit (RCU) or keypad to support channel change or selection, which is reflected by the "tune( )" function. A function that may be performed by the activity 301 is to create two viewing surfaces that give the user a view of the video associated with the service (the "Player Surface") and any overlays (the "Overlay Surface") that a broadcaster application (e.g., HTML5 web application) might produce. The Player Surface may be handled by the media player 313, while the Overlay Surface may be handled by Webview 315.

In FIG. 3, the tuner device 305 is a hardware device that can tune to and demodulate an ATSC 3.0 broadcast signal, and produce a sequence of ATSC 3.0 Link layer Protocol (ALP) packets. In some embodiments, the ALP packets are converted to IP packets in the tuner device 305 and the tuner device 305 passes the IP packets across the USB interface 325. In other embodiments, the ALP packets are passed across the USB interface 325 and are converted to IP packets by converter 321 in the television receiver application 303. When the ALP packets are passed across the USB interface 325, the link layer processing used to retrieve IP packets from ALP packets (mainly involving IP header decompression) can be done either within the tuner device 305 or within the television receiver application 303.

In one embodiment, the tuner device 305 is an external USB-connected device that connects to the electronic device via a USB port. Upon being launched, the television receiver application 303 may use a UsbManager Android Class 323.

The television receiver application 303 provides functionality allowing the rendering and display to the user of broadcast (and OTT) streaming video, as well as audio and closed captioning data. Furthermore, the television receiver application 303 may support a "runtime environment" through which broadcaster applications may be executed. A broadcaster application may include content that includes HTML markup, JavaScript, and CSS as specified in ATSC A/344 "ATSC 3.0 Interactive Content." In addition to functionality supported by standard web browsers, additional functionality may be incorporated by means of a Web Sockets protocol. The Web Sockets APIs specified in A/344 add support for capabilities including access to tuning functions, memory management, interaction between the broadcaster application and the receiver's media player (RMP), among many others.

In some embodiments, a broadcaster web application may be provided by a broadcaster as an adjunct to a regular streaming broadcast television service to provide interactivity or to operate in the background, for example, to monitor the user's usage of the service. Furthermore, the broadcaster may define a type of service that is presented as the output of the broadcaster application that is associated with that service. Such services cannot be offered by an ATSC 3.0 receiver that does not support the A/344 interactive content specification.

In some embodiments, an electronic device may be any device implemented on the Android OS platform, for example. A television receiver application has either been pre-installed by the manufacturer of the device, or the user has downloaded and installed the television receiver application from an application store such as the Google Play Store.

Figure 4:
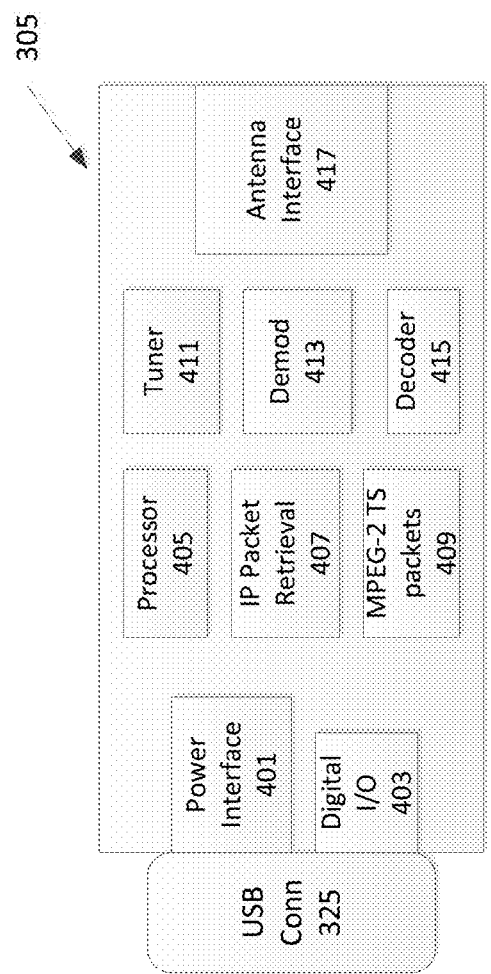
FIG. 4 illustrates an exemplary tuner device with a USB interface.

FIG. 4 is a block diagram of an embodiment of a tuner device 305 in accordance with an exemplary aspect of the disclosure. In some embodiments, the tuner device 305 is a USB-connected dongle or the like which may receive power by way of a Power Interface 401 when the USB connector 325 is attached to a USB port. In other embodiments, the tuner device 305 may be battery operated and configured to provide power. Furthermore, in additional embodiments, the tuner device 305 may be configured to both receive and provide power.

In some embodiments, the tuner device 305 can receive an ATSC 3.0 broadcast signal or an ATSC 1.0 signal. An antenna interface circuit 417 receives the broadcast signal. A tuner 411 performs selective tuning to select a radio frequency (RF) of a television channel from within a band of transmitted RF signals. The television channel may have been detected through a channel scan process.

A processor 405 controls a demodulator circuit 413 and a decoder 415 to decode orthogonal frequency-division multiplexing (OFDM) symbols into one or more PLPs. ALP packets are obtained from the PLPs. In some embodiments, the decoder 415 performs High Efficiency Video Coding (HEVC) decoding. In some embodiments, the decoder 415 performs a scalability extended HEVC decoding (SHVC). In the case that the broadcast signal is an ATSC 1.0 broadcast signal, the processor 405 controls the demodulator 413 and decoder 415 to decode an MPEG transport stream. MPEG-2 Transport Stream (TS) packets 409 may be sent through the USB connector 325 via digital I/O 403.

In one embodiment, the tuner device 305 may perform IP packet retrieval 407 from ALP packets. The IP packets may be formatted according to User Datagram Protocol (UDP). Otherwise the function of converting ALP packets into IP packets may be performed by the device to which the tuner device 305 is connected.

Figure 5:
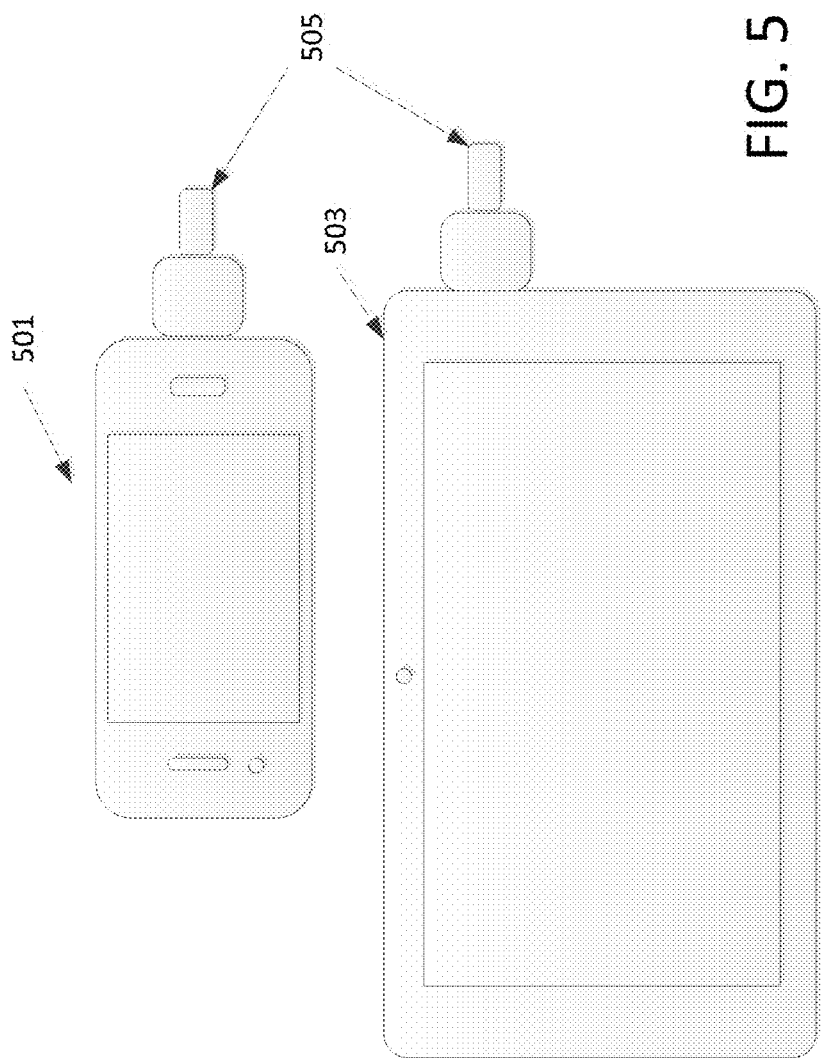
FIG. 5 is an exemplary arrangement of a computer information processing apparatus with a USB-connected tuner.

FIG. 5 is a schematic diagram that illustrates an embodiment of a smartphone 501 and a tablet computer 503 each having a tuner device 505 connected thereto. The tuner device 505 may include, or otherwise connect to, an antenna for picking up UHF frequencies and/or VHF frequencies.

Figure 6:
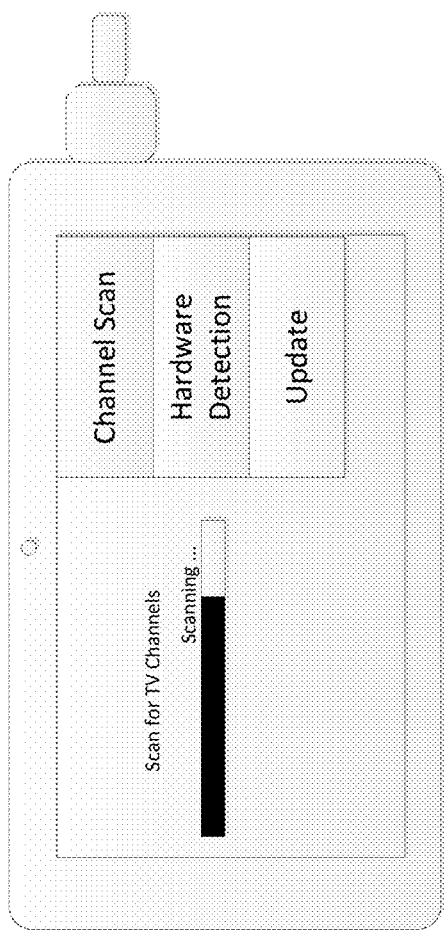
FIG. 6 is an exemplary screen for setting up an information processing apparatus for DTV reception using the USB-connected tuner.

FIG. 6 is a schematic diagram that shows an example screen that may be displayed during a channel scan operation. The screen may include a menu that offers options of selecting a channel scan, hardware detection, and check for updates.

Figure 7:
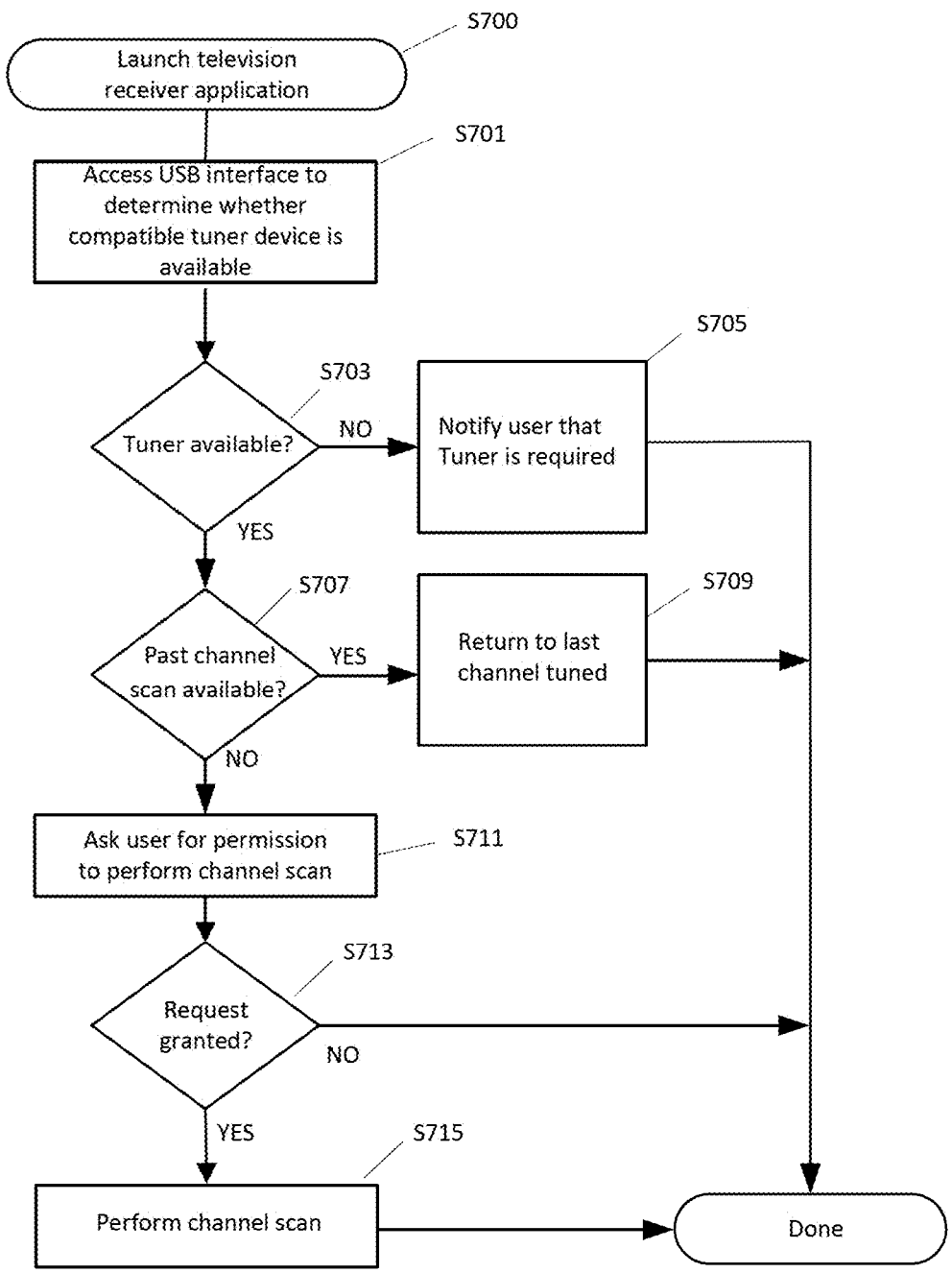
FIG. 7 is an exemplary flowchart of a process for launching a television receiver application.

FIG. 7 is a flowchart of an embodiment of a process for when the television receiver application is first launched. The process may start at step S700 where the television receiver application can be launched from the application tray as are any application on a smartphone (e.g., downloaded applications like Facebook, Twitter, Chrome, etc.). The television receiver application includes an Activity component which provides the experience the user interacts with when the application is launched. To provide the "watch TV" experience, the Activity component can request a full-screen video Player Surface.

The process proceeds to step S701, where the television receiver application accesses the USB interface to determine whether a tuner device is available. For example, via the UsbManager Android class, the television receiver application invokes UsbManager.getAccessoryList( ) method to determine whether a tuner device is available. The process proceeds to step S703, where the television receiver application processes the retrieved list of accessories to see if a compatible tuner device (e.g., ATSC 3.0 tuner device) has been connected to the USB interface as an accessory.

If no tuner device is available, the process proceeds from step S703 to step S705 to notify the user (e.g., by onscreen text) that the TV reception function depends on the availability of such an accessory and indicate possible model numbers and sources for such a device. When the notification is displayed in step S705, TV-related activities may be halted, and the process illustrated in FIG. 7 ends.

If a tuner device is available, the process proceeds from step S703 to step S707, where the television receiver application determines whether a past channel scan is available. If a record of a past channel scan is available, the process proceeds from step S707 to step S709, where the television receiver application issues a command to the tuner device to return to the last RF channel tuned, where the last accessed service is reacquired. The process in FIG. 7 is completed after all possible RF channels have been tuned and processed. If no record of the past channel scan is available, the process proceeds from step S707 to step S711 where the user is asked permission to perform a channel scan. A user may decide to delay the channel scan since the channel scan may be time consuming, or if the user knows that the antenna is currently not connected.

The process proceeds to step S713 to determine whether the user has granted the request to perform the channel scan. If the user has not granted the request to perform the channel scan, the process illustrated in FIG. 7 ends. However, if the user has granted the request to perform the channel scan, the process proceeds to step S715 to perform the channel scan. The process in FIG. 7 is completed after the channel scan is performed.

In some embodiments, the tuner device may be configured to deliver ALP packets across the USB interface, in which case both ALP packets containing IP packets as well as ALP packets containing Link Layer Signaling are provided to the television receiver application. The LMTs are delivered with the Link Layer Signaling packets.

In some embodiments, the tuner device is configured to convert ALP packets to IP packets. If the tuner device delivers IP packets across the USB interface, then one or more other methods are used to deliver the LMTs needed by the television receiver application to manage PLP selection. For example, in one method, the tuner device delivers each LMT in a UDP/IP packet with a specifically chosen IP source address and port number that does not conflict with any address/port number the broadcaster is allowed to use. In another method, the tuner device delivers packets containing LMTs in a separate stream across the USB interface (e.g., separate from the stream containing the IP packets associated with the broadcast). In another method, the tuner device delivers LMT data via command/control transactions via an application programming interface. For example, the television receiver application can request, via a command, the tuner device to provide the LMT data, where in response, the tuner device would respond with the LMT or an aggregated LMT if there are multiple LMT instances.

According to some embodiments, the television receiver application performs a channel scan when first installed or whenever the physical location of the electronic device is changed in such a way that some transmission signals that had been receivable before are no longer receivable, or some that had not been available are available at the new location. The channel scan involves, for example, an iterative operation in which each RF channel that might be broadcasting a television signal is tuned, in succession. At each frequency, if a television broadcast is found, Link Layer Signaling tables, Low Level Signaling tables, and Service Layer Signaling tables are retrieved and stored. After the channel scan, the user can "channel surf" through all the channels that have been found or can use "direct entry" to select a service of interest. For example, if a service associated with major/minor channel number 4.1 is found during the scan, "4.1" may be entered on the remote control or by whatever method of navigation is offered by the device.

Figure 8:
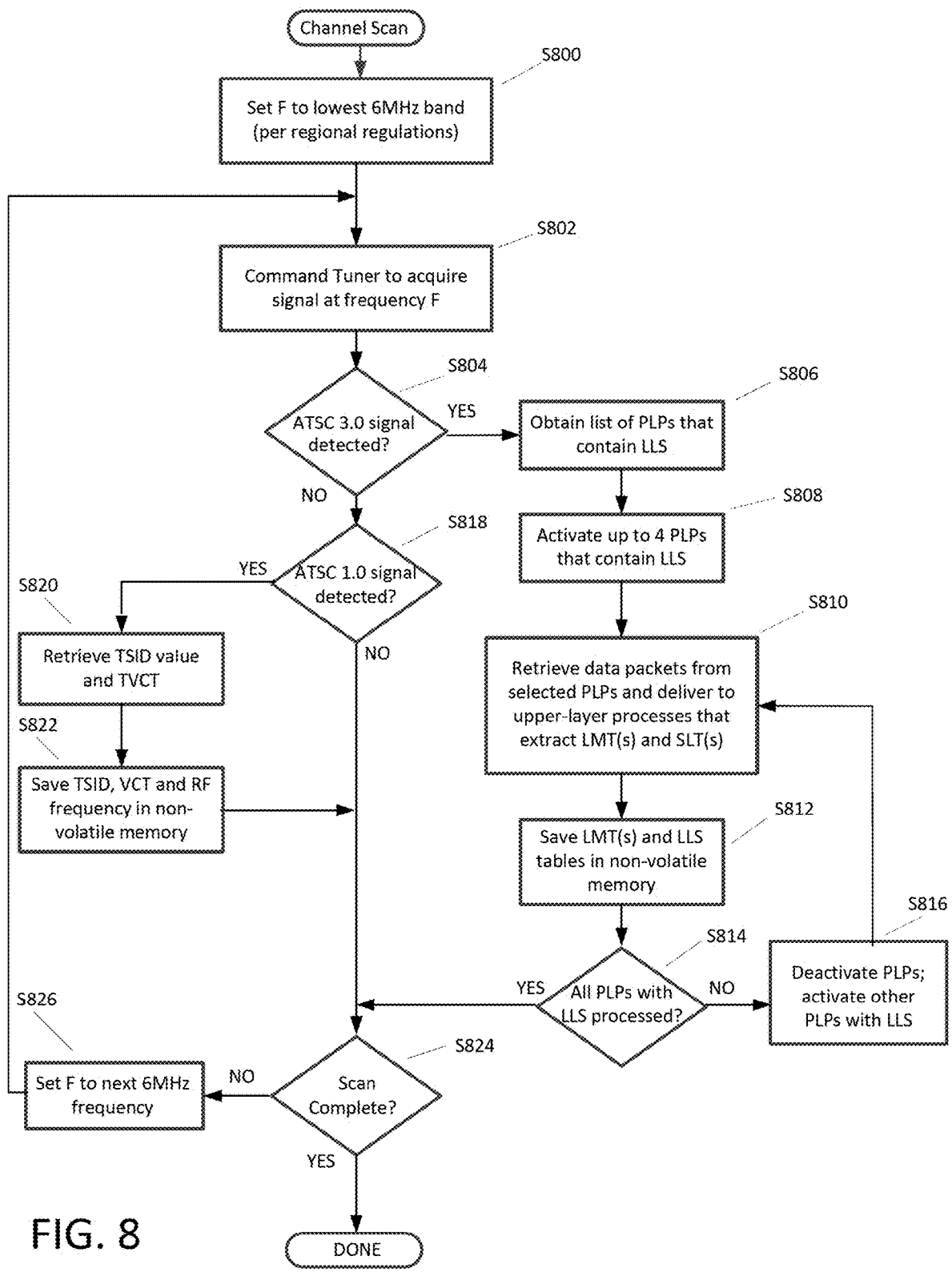
FIG. 8 is an exemplary flowchart of a process for performing a channel scan.

FIG. 8 is a flowchart of an embodiment of a channel scan operation. The process in FIG. 8 may be performed by an electronic device executing the television receiver application, where a tuner device is connected to the electronic device and receives instructions from the television receiver application for performing the channel scan operation. The process may generally start at step S800 where the television receiver application sets a frequency F at the lowest possible RF channel (e.g., 6 MHz) band that might be in use by a local broadcaster or mandated by regional regulations. The process proceeds to step S802 where the television receiver application sends a command to the tuner device to acquire a signal at the frequency F.

The process proceeds to step S804 to determine whether an acquired signal is an ATSC 3.0 signal. If the ATSC 3.0 signal is detected, the process proceeds to step S806 where a list of PLPs that contain low level signaling (LLS) are obtained. The list may include the type of time interleaving used for each PLP (HTI, CTI or none). For example, if the ATSC 3.0 signal is detected, a physical layer frame is inspected to discover which PLP or PLPs contain LLS. Determining whether a PLP contains LLS may be performed by looking for a value of '1' (true) in a L1B_lls_flag in a physical layer frame, and then processing L1 Detail signaling to discover the PLP(s) which carry LLS. If the L1D_plp_lls_flag is set to '1' for an associated L1D_plp_id value, that PLP ID is determined to carry LLS. Therefore, the PLP IDs that are determined to carry LLS may be placed on a list provided to the television receiver application. Determining what type of time interleaving is used for any given PLP is signaled by the value of the 2-bit L1-Detail signaling field L1D_plp_TI_mode.

Figure 9:
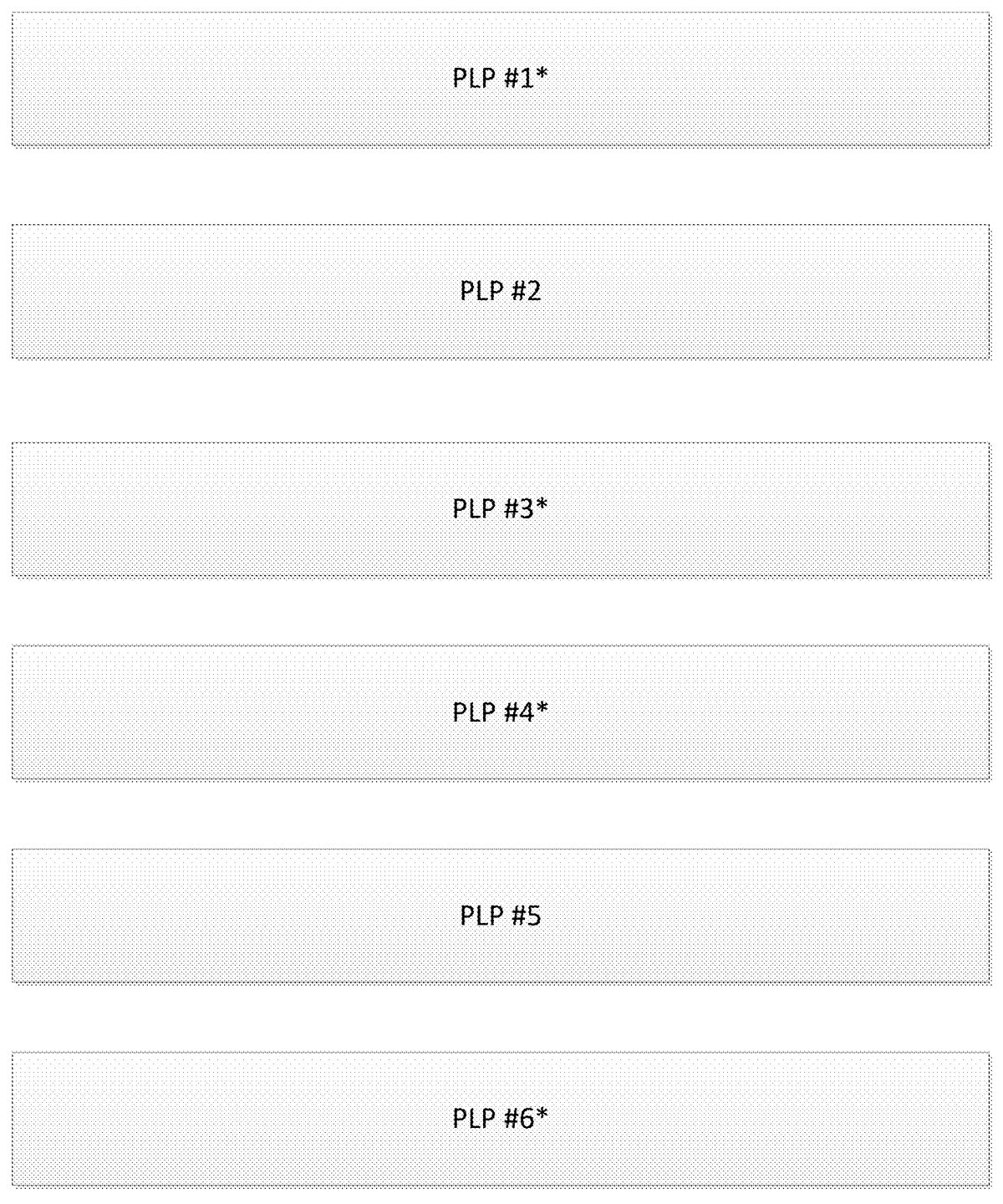

The process proceeds from step S806 to step S808 to activate one or more (to a maximum of four) PLPs that are identified carrying the LLS. As noted, if a given PLP uses CTI time interleaver mode, the receiver may be able to only activate one such PLP at any given time. FIG. 9 illustrates example PLPs #1-#6. In this example, all the PLPs use HTI interleaver mode, thus allowing the exemplary receiver to process up to four in parallel. In this figure, PLPs with a * are PLPs that carry LLS. Accordingly in this example, in step S808, PLPs #1, #3, #4, and #6 are selected. Although a maximum of four PLPs are activated in step S808, in other embodiments, any desired number of PLPs may be activated including more than 4 PLPs.

The process proceeds to step S810 where the television receiver application retrieves data packets from the selected PLPs, and the retrieved data packets are delivered to upper-layer processes that extract the LMT(s) and LLS tables such as a Service List Table (SLT). The SLT is defined in A/331.

The process proceeds to step S812, where the retrieved LMT(s) and LLS tables for the current RF channel are saved in non-volatile memory. Other signaling tables can be saved as well to speed up service acquisition. For example, Service Layer Signaling (SLS) tables such as the S-TSID can be saved and used on an interim basis during the early stages of service acquisition. Once SLS tables are retrieved upon acquisition, if any value that had been used during the early stages is found to have changed, a correction can be made at that time.

The process proceeds to step S814 to determine whether all the PLPs with the LLS are processed. For example, the tuner device may not be capable of processing more than four PLPs at any given time, and thus, the number of activated PLPs in step S808 may be limited by the number of PLPs that the tuner device can process at any given time.

If it is determined in step S814 that there are more PLPs with LLS left to be processed, the process proceeds to step S816 where the PLPs activated in step S808 are deactivated, and other PLPs carrying LLS tables are activated. For example, in step S816, up to 4 additional PLPs carrying LLS tables are activated. The process proceeds from step S816 to step S810, where the process for step S810, and the steps executed thereafter, are repeated as described above.

If it is determined in step S814 that all the PLPs carrying LLS are processed, the process proceeds to step S824 to determine whether the channel scan is completed. If the channel scan is completed (e.g., all available RF channels have been scanned), the process illustrated in FIG. 8 is completed. However, if the channel scan is not completed, the process proceeds to step S826 where the television receiver application continues the channel scan operation by setting the frequency F to the next 6 MHz frequency. The proceeds to step S802, where the process described above for step S802, and the steps executed thereafter, are repeated as described above.

Returning to S804, if the ATSC 3.0 signal is not detected, the process proceeds to step S818 to determine whether the acquired signal is an ATSC 1.0 signal. If no ATSC 1.0 signal is detected, the process proceeds to step S824, where the process for step S824, and the steps executed thereafter, are repeated as described above.

If the ATSC 1.0 signal is detected, the process proceeds from step S818 to step S820 where the television receiver application retrieves the Transport Stream ID (TSID) and Terrestrial Virtual Channel Table (TVCT) for the detected ASTC 1.0 signal. A description for the TVCT is provided in the A/65 standard—"ATSC Standard: Program and System Information Protocol for Terrestrial Broadcast and Cable," dated Aug. 7, 2013, the entire contents of which are incorporated herein by reference.

The process proceeds to step S822 where the television receiver application saves the TSID, TVCT, and RF frequency for the detected ATSC 1.0 signal in memory. The process proceeds from step S818 to step S824, where the process for step S824, and the steps executed thereafter, are repeated as described above. In this regard, the process illustrated in FIG. 8 is completed when each available RF channel has been scanned.

According to some embodiments, "channel bonding" (see (i) ATSC Standard A/322—Physical Layer Protocol, dated Jun. 6, 2017, the entirety of which is incorporated herein by reference, (ii) A/321, and (iii) A/331) may be implemented when two or more tuners are available simultaneously to acquire a single service. When channel bonding is implemented, signaling in the PHY layer that points to transmission signals on other RF channels is saved, so that the second tuner can be used to retrieve data from the bonded parts.

In some embodiments, the USB interface 325 shown in FIG. 3 is a standard hardware interface known to one of ordinary skill in the art, and the operating system may utilize APIs known to anyone of ordinary skill in the art to manage this interface. For example, the ATSC 3.0 device may identify itself via a Device Descriptor (see Universal Serial Bus Specification, Revision 2.0, dated Apr. 27, 2000, the entirety of which is incorporated herein by reference) as an Audio/Video device (base class 10h). For an ATSC 3.0 tuner device 205 connected by USB, an API is used, in some embodiments, to extend the basic communication provided by the USB protocol.

Figure 10:
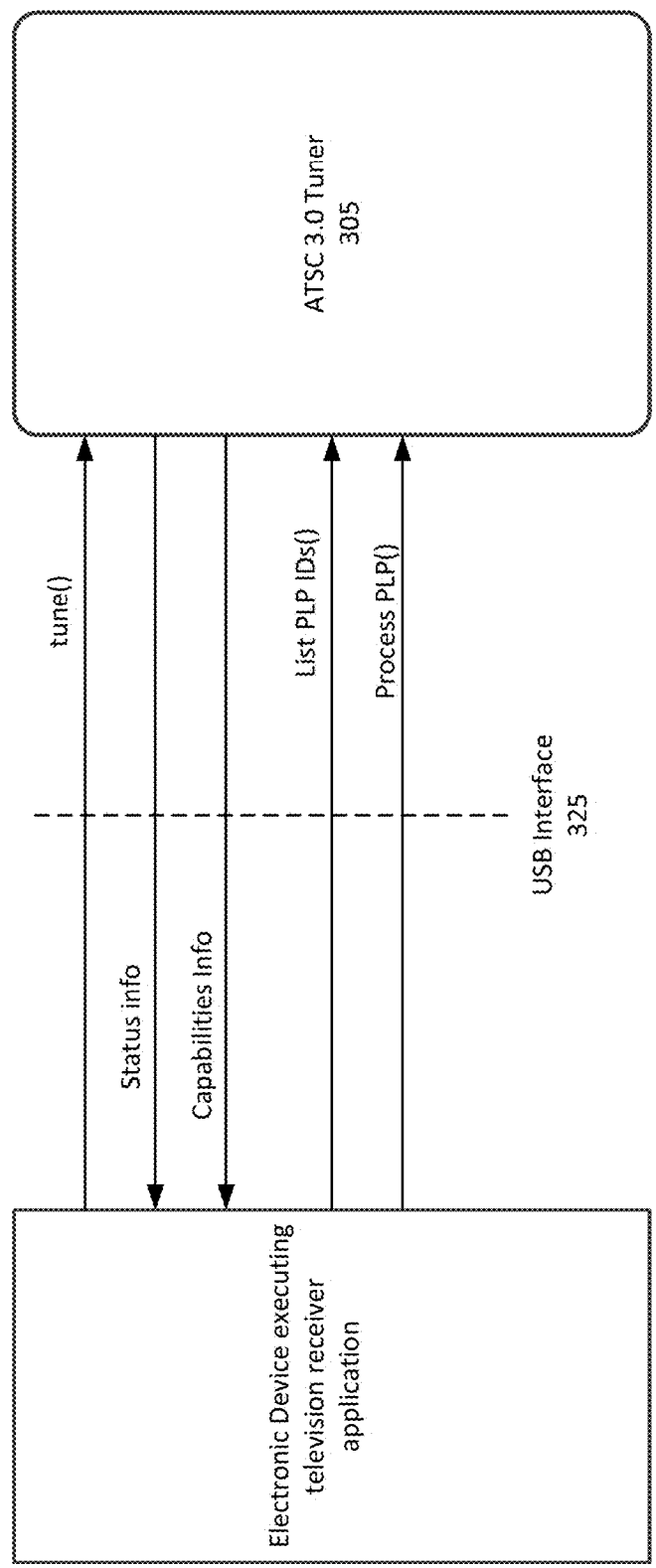
FIG. 10 is an exemplary block diagram illustrating messages passed between an information processing apparatus and a tuner device.

FIG. 10 is a block diagram illustrating an embodiment of commands and messages supported by the API provided by the tuner device and utilized by the receiver application. For example, the electronic device 200 (FIG. 2) may send, via the API, a Tune Command ("tune( )") to the tuner 305 to tune to a given 6 MHz RF frequency band to look for either an ATSC 1.0 and/or an ATSC 3.0 broadcast signal. The tuner device 305 may send, via the API, a status indication (e.g., "Status Info") to the electronic device 200 to indicate the status of reception, including what type of signal has been acquired if any (e.g., ATSC 1.0 or ATSC 3.0), an indication as to the signal strength, and whether a TV broadcast signal has been found.

The tuner device 305 may further send, via the API, a capabilities message (e.g., "Capabilities Info") to the electronic device to indicate the capabilities of the tuner device. For example the capabilities message may indicate whether the tuner device 305 supports channel bonding (e.g. whether or not the tuner device includes multiple tuner functions that can be independently controlled, and used to bond PLPs according to the ATSC standards). The electronic device 200 may further send, via the API when an ATSC 3.0 signal has been acquired, a command (e.g., "List PLP IDs( )") to the tuner device 305 to list the PLP ID values of PLPs containing LLS. The electronic device 200 may further send, via the API, a process PLP Command ("Process PLP( )") to the tuner device 305 to process one or more PLPs (typically, a maximum of four), where the PLPs to be processed are identified by their PLP ID values.

The tuner device 305 streams either ALP or IP packets across the USB interface for each PLP chosen for processing. If IP packets are streamed, then the API may include additional commands to handle the communication of LMT data. For example, the API may include a request LMT command from the television receiver application to the tuner device 305 to request LMT data. Furthermore, the API may include a notification from the tuner device 305 to the television receiver application that new LMT data is available.

Figure 11:
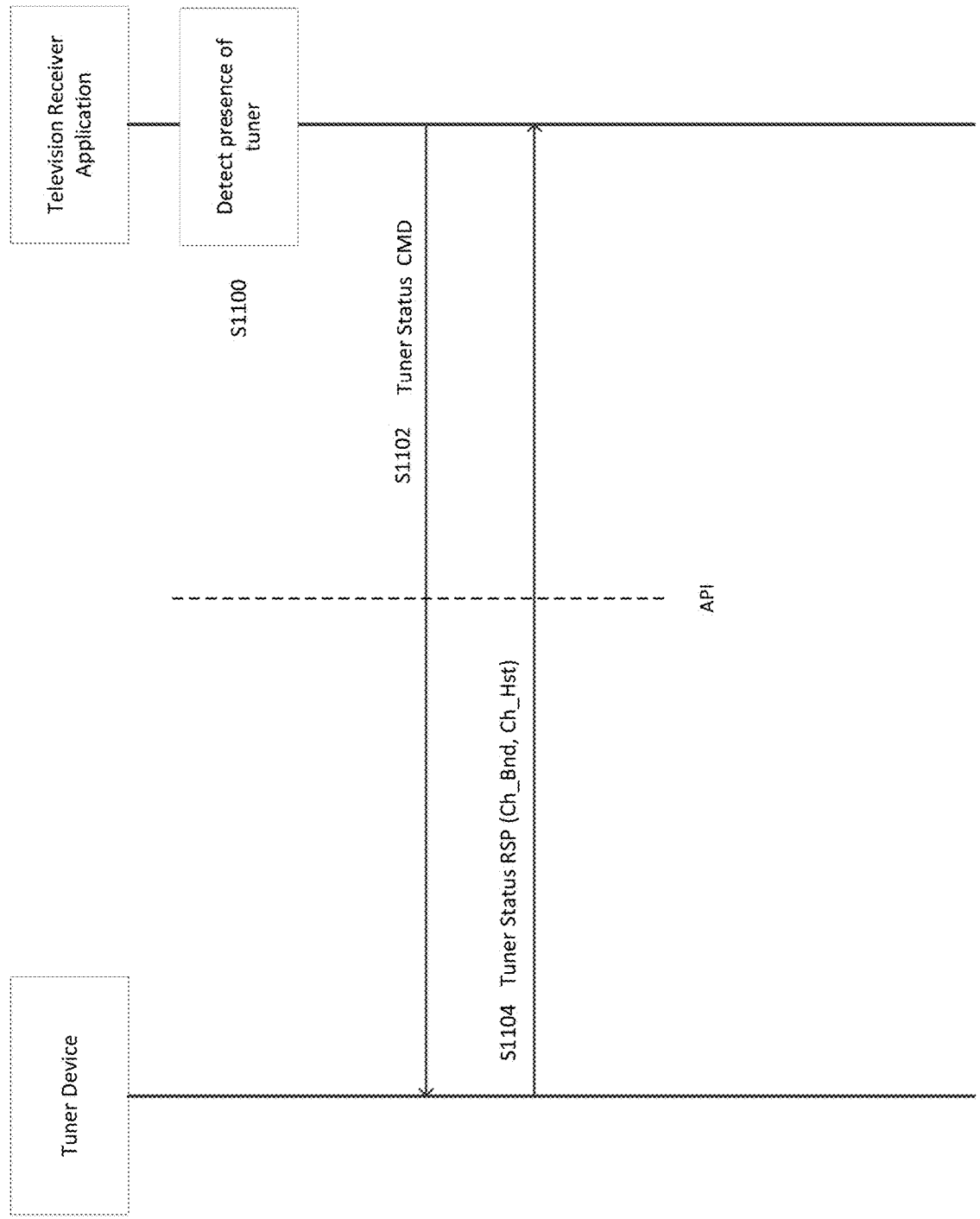
FIGS. 11-13 illustrate exemplary sequence diagrams illustrating messages transmitted between an electronic device and a tuner device via an application programming interface (API).

FIG. 11 illustrates a sequence diagram of an embodiment of a process performed between the television receiver application and the tuner device using the API. In this regard, commands and messages transmitted between the television receiver application and the tuner device are passed through the API.

The process illustrated in FIG. 11 may take place when the television receiver application is launched or the tuner device is initially connected to the electronic device. In step S1100, the television receiver application detects the presence of a tuner. For example, the electronic device may execute a USB interface function, which may be native to the electronic device's OS, in which newly connected devices are detected and registered. The television receiver application may use an API within the electronic device's native OS to determine what kind of device(s) is/are connected to the electronic device. In some embodiments, the electronic device determines whether a compatible tuner is present. The tuner device, when it is plugged in, may register its presence to the electronic device. This type of registration may occur at power-up of the electronic device.

In step S1102, upon learning of the presence of the tuner device, the television receiver application sends a tuner status command via the API to the tuner device. In step S1104, the tuner device sends the tuner status response via the API to the electronic device. In some embodiments, the tuner status response can include parameters such as a channel bonding (Ch_Bnd) parameter indicating whether channel bonding is supported, and a channel history (Ch_Hst) parameter providing a last tuned channel of the tuner device. The Ch_Hst parameter may also be a null value indicating that no channel history exists. In some embodiments, the Ch_Hst parameter is stored in the electronic device instead of being provided by the tuner device.

Figure 12:
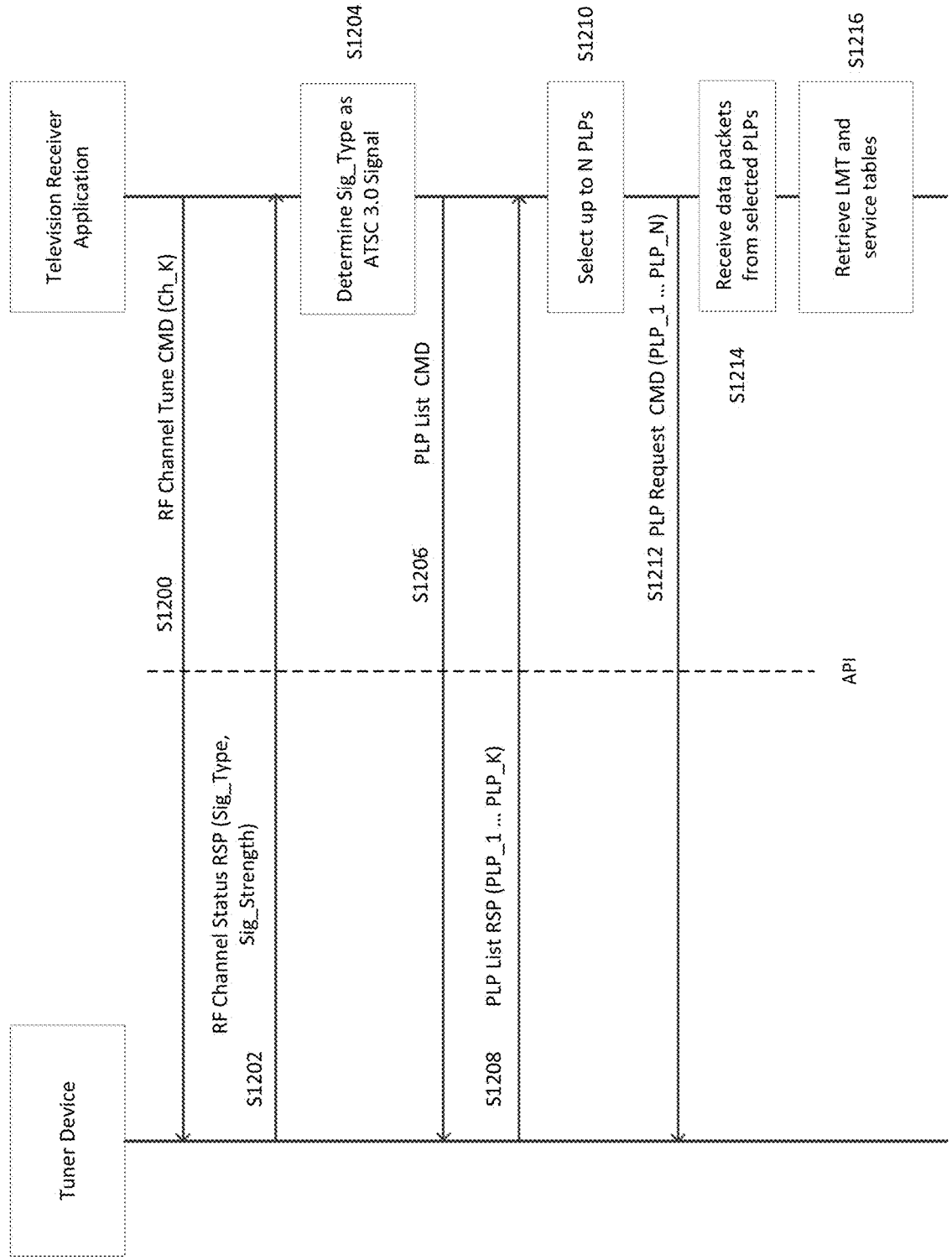

FIG. 12 illustrates an example sequence diagram of an embodiment of a process performed between the television receiver application and the tuner device in which commands and messages are passed through the API. The process in FIG. 12 may take place after the electronic device learns of the presence of the tuner device.

In step S1200, the television receiver application issues an RF channel tune command via the API to the tuner device. The RF channel tune command can include a parameter Ch_K, which may be an RF channel that the tuner is instructed to tune to. As an example, when the television receiver application has a record of the last tuned channel, Ch_K may represent the last tuned channel. However, if the television receiver application is performing a channel scan, Ch_K may represent the lowest 6 MHz RF channel.

In step S1202, the tuner device sends an RF channel status response. This response may include a signal type parameter (Sig_Type) indicating whether an ATSC 1.0 signal or an ATSC 3.0 signal (or neither) is found and a signal strength parameter (Sig_Strength). In step S1204, the television receiver application determines that the ATSC 3.0 signal is found. In step S1206, the television receiver application issues a PLP list command via the API to the tuner device. In step S1208, the tuner device provides a PLP list response command that includes a list of PLPs (e.g., PLP_1 to PLP_k). As an example, the PLPs listed in the PLP list response command are PLPs that include LLS. The response may indicate the type of time interleaving used for each PLP (HTI, CTI or none).

In step S1210, the television receiver application examines the list of PLPs provided from the tuner device and selects up to N PLPs that contain LLS. The number of selected PLPs may be a predetermined number such as four. In step S1212, the television receiver application issues a PLP request command that includes the list of PLPs selected in step S1210 (e.g., PLP_1 to PLP_N). In step S1214, the television receiver application receives data packets from the selected PLPs. The tuner device may stream the data packets across a communication path different than the API illustrated in FIG. 12. In some embodiments, the tuner device sends ALP data packets in S1214. If the tuner device is configured to convert ALP packets to IP packets, the tuner device can send IP packets that include the LMT. In step S1216, the television receiver application examines the received data packets to retrieve at least a LMT and one or more SLTs.

Figure 13:
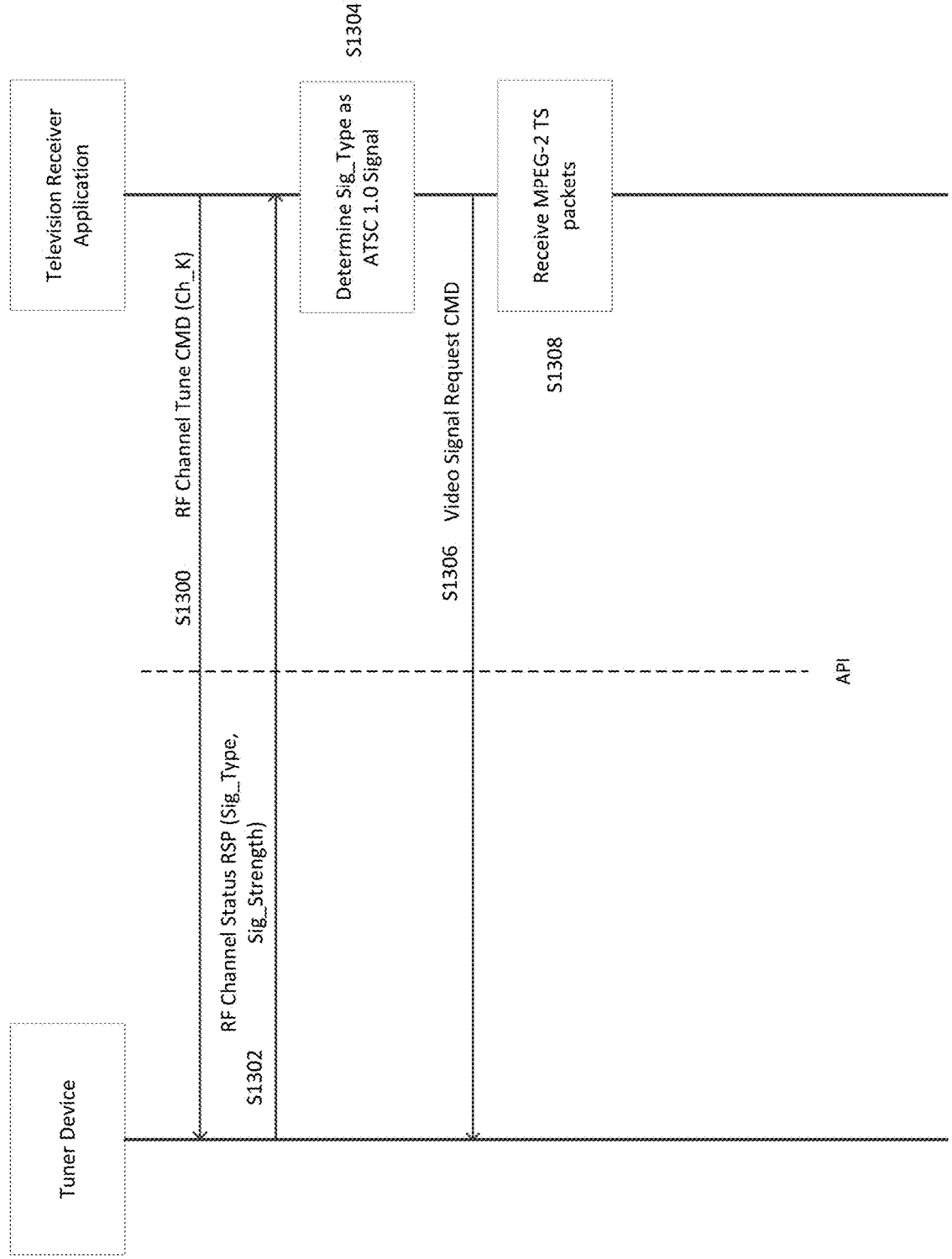

FIG. 13 illustrates an example sequence diagram of an embodiment of a process performed between the electronic device executing the television receiver application and the tuner device. This process may be performed when the tuner device detects an ATSC 1.0 signal. Steps S1300 and S1302 correspond to steps S1200 and S1202 in FIG. 12. In step S1304, the television receiver application examines the signal type parameter (Sig_Type) provided in step S1302 and determines that the ATSC 1.0 signal was received. In step S1306, the television receiver application issues a video signal request command via the API to the tuner device. In step S1308, the television receiver application receives MPEG-2 TS packets (Video Stream). The MPEG-2 TS packets may be received across a communication path other than the API illustrated in FIG. 13.

Figure 14:
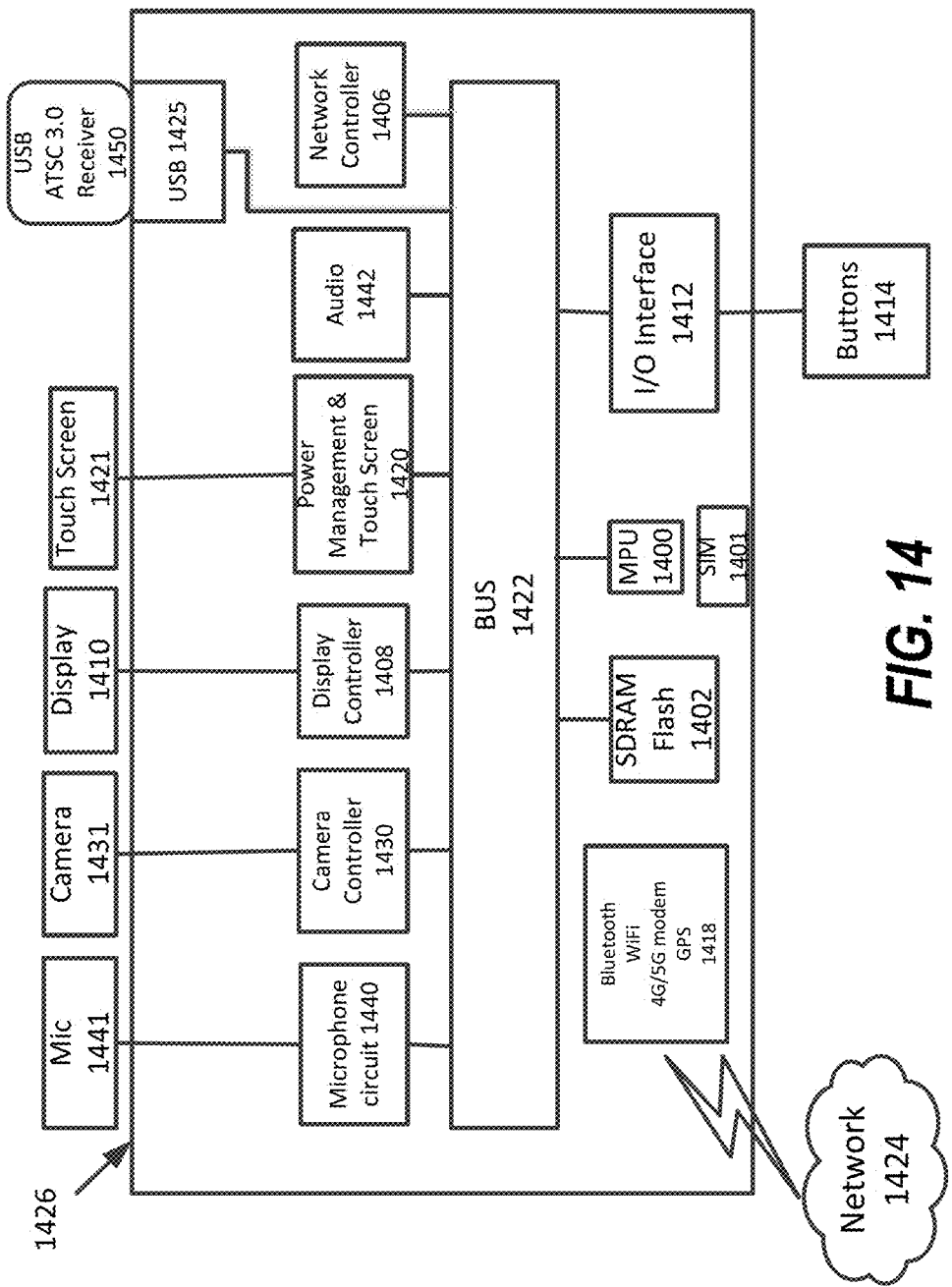
FIG. 14 illustrates an example hardware configuration of an information processing apparatus.

FIG. 14 is a block diagram showing an example of a hardware configuration of a processing circuit 1426 that can be configured to perform functions of the electronic device.

In FIG. 14, the processing circuit 1426 includes a micro processing unit (MPU) 1400 which performs the processes described herein. The process data and instructions may be stored in memory 1402. These processes and instructions may also be stored on a portable storage medium or may be stored remotely. The processing circuit 1426 may have a replaceable Subscriber Identity Module (SIM) 1401 that contains information that is unique to the network service of the mobile device 121.

Further, the claimed advancements are not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing circuit 1426 communicates, such as a server or computer.

Further, the claimed advancements may be provided as a utility application, background daemon, or component of an operating system, or combination thereof, executing in conjunction with MPU 1400 and a mobile operating system such as Android, Microsoft® Windows® 10 Mobile, Apple iOS® and other systems known to those skilled in the art.

In order to achieve the processing circuit 1426, the hardware elements may be realized by various circuitry elements, known to those skilled in the art. For example, MPU 1400 may be a Qualcomm mobile processor, a Nvidia mobile processor, an Atom® processor from Intel Corporation of America, a Samsung mobile processor, or an Apple A7 mobile processor, or may be other processor types that would be recognized by one of ordinary skill in the art. Alternatively, the MPU 1400 may be implemented on a Field-Programmable Gate Array (FPGA), Application Specific Integrated Circuit (ASIC), Programmable Logic Device (PLD) or using discrete logic circuits, as one of ordinary skill in the art would recognize. Further, MPU 1400 may be implemented as multiple processors cooperatively working in parallel to perform the instructions of the inventive processes described above.

The processing circuit 1426 in FIG. 14 also includes a network controller 1406, such as an Intel Ethernet PRO network interface card from Intel Corporation of America, for interfacing with network 1424. As can be appreciated, the network 1424 can be a public network, such as the Internet, or a private network such as LAN or WAN network, or any combination thereof and can also include PSTN or ISDN sub-networks. The network 1424 can also be wired, such as an Ethernet network. The processing circuit may include various types of communications processors for wireless communications including 3G, 4G and 5G wireless modems, WiFi®, Bluetooth®, GPS, or any other wireless form of communication that is known.

The processing circuit 1426 includes a Universal Serial Bus (USB) controller 1425 which may be managed by the MPU 1400. In one embodiment, the tuner is a hardware device in an ATSC 3.0 DTV receiver 1450 that can tune to and demodulate an ATSC 3.0 broadcast signal, and produce a sequence of ATSC 3.0 link layer protocol packets.

The processing circuit 1426 further includes a display controller 1408, such as a NVIDIA® GeForce® GTX or Quadro® graphics adaptor from NVIDIA Corporation of America for interfacing with display 1410. An I/O interface 1412 interfaces with buttons 1414, such as for volume control. In addition to the I/O interface 1412 and the display 1410, the processing circuit 1426 may further include a microphone 1441 and one or more cameras 1431. The microphone 1441 may have associated circuitry 1440 for processing the sound into digital signals. Similarly, the camera 1431 may include a camera controller 1430 for controlling image capture operation of the camera 1431. In an exemplary aspect, the camera 1431 may include a Charge Coupled Device (CCD). The processing circuit 1426 may include an audio circuit 1442 for generating sound output signals, and may include an optional sound output port.

The power management and touch screen controller 1420 manages power used by the processing circuit 1426 and touch control. The communication bus 1422, which may be an Industry Standard Architecture (ISA), Extended Industry Standard Architecture (EISA), Video Electronics Standards Association (VESA), Peripheral Component Interface (PCI), or similar, for interconnecting all of the components of the processing circuit 1426. A description of the general features and functionality of the display 1410, buttons 1414, as well as the display controller 1408, power management controller 1420, network controller 1406, and I/O interface 1412 is omitted herein for brevity as these features are well known.

While conventional electronics products have incorporated USB-connected tuners, the present disclosure enables ATSC-3.0 specific aspects. Specifically, the ATSC television receiver application of the present disclosure implements:
1. Signaling across the USB interface to identify to which digital television standard a received signal corresponds;
2. Delivery of ATSC A/330 ALP packets across the USB interface;
3. Delivery of multicast UDP/IP packets received from an IP-based digital television broadcast signal across the USB interface;
4. Delivery of Link Layer Signaling across the USB interface to allow the host to manage the selection of PLP resources in the tuner device;
5. Delivery of Link Layer Signaling data across the USB interface using a dedicated (predetermined) IP source address and port;
6. A command and control interface across the USB interface to an ATSC 3.0-capable tuner device to enable, for example, selection of PLPs for processing.

Numerous modifications and variations are possible in light of the above teachings. It is therefore to be understood that within the scope of the appended claims, the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the claims. The disclosure, including any readily discernible variants of the teachings herein, defines, in part, the scope of the foregoing claim terminology such that no inventive subject matter is dedicated to the public.

The above disclosure also encompasses the embodiments listed below.

(1) An information processing apparatus comprising: a communication interface configured to connect to a tuner device and processing circuitry configured to: (a) issue a first command, via an application programming interface (API) that enables communication between the processing circuitry and the tuner device across the communication interface, that instructs the tuner device to tune to a RF channel of a broadcast stream, (b) in response to reception of an indication from the tuner device that the RF channel is acquired, and the received indication specifies a signal type of the acquired RF channel is a first predetermined type of signal, (i) issue a second command, via the API, that instructs the tuner device to identify each physical layer pipe (PLP) in the broadcast stream that includes low level signaling (LLS) tables, (ii) issue a third command, via the API, that instructs the tuner device to select up to a predetermined number of PLPs from the identified PLPs and send data packets from the selected PLPs to the processing circuitry, and (iii) process the data packets to retrieve signaling content and content of a television service.

(2) The information processing apparatus according to feature (1), in which the data packets from the selected PLPs are link layer packets converted by the tuner device into UDP/IP packets.

(3) The information processing apparatus according to feature (1) or (2), in which the data packets from the selected PLPs are Advanced Television Systems Committee (ATSC) link-layer protocol (ALP) packets, wherein the processing circuitry is further configured to convert the ALP packets to IP packets.

(4) The information processing apparatus according to any one of features (1)-(3), in which the data packets include (i) one or more Service List Tables (SLTs) that specify each IP address associated with a television service included in the broadcast stream, and (ii) one or more Link Mapping Tables (LMTs) that provide a mapping between each IP address specified in the SLT and one or more PLPs associated with the television service.

(5) The information processing apparatus according to any one of features (1)-(4), in which in response to a determination that one or more identified PLPs that include the LLS tables has not been processed the processing circuitry is further configured to issue a fourth command, via the API, that causes the tuner device to (i) deactivate the selected PLPs, (ii) select up to a predetermined number of the one or more identified PLPs that have not been processed, and (iii) send data packets from the selected one or more identified PLPs that have not been processed.

(6) The information processing apparatus according to any one of features (4) or (5), in which the processing circuitry is configured to receive the one or more LMTs via an IP packet stream that is separate from a stream containing data packets associated with the television service.

(7) The information processing apparatus according to any one of features (1)-(6), in which in response to a determination that the RF channel is acquired and the signal type of the acquired RF channel is a second predetermined type of signal, the processing circuitry is configured to issue a fourth command, via the API, that causes the information processing apparatus to receive MPEG-2 Transport Stream (TS) packets.

(8) The information processing apparatus according to any one of features (1)-(7), in which the first predetermined type of signal is an Advanced Television Systems Committee (ATSC) 3.0 signal, and wherein the second predetermined type of signal is not an ATSC 3.0 signal.

(9) The information processing apparatus according to any one of features (1)-(8), in which in response to a determination that a record of a past channel scan is available, the processing circuitry is configured to access the record of the past channel scan to determine a last RF channel tuned, and the first command is an instruction for the tuner device to tune to the determined last RF channel tuned.

(10) The information processing apparatus according to any one of features (1)-(9), in which in response to a determination that the record of the past channel is not available, the first command is an instruction to tune to the lowest available RF channel.

(11) The information processing apparatus according to any one of features (1)-(10), in which the circuitry is further configured to, prior to issuing the first command: determine whether the tuner device is connected to the USB interface, and in response to a determination that the tuner device is not connected to the USB interface, output an appropriate message to the user.

(12) The information processing apparatus according to any one of features (1)-(11), in which the communication interface is a Universal Serial Bus (USB) interface.

(13) The information processing apparatus according to any one of features (1)-(12), in which the communication interface is a wireless interface.

(14) A tuner device comprising a communication interface configured to connect to an information processing apparatus and processing circuitry configured to: (a) receive a first command from the information processing apparatus, via an application programming interface (API) that enables communication between the information processing apparatus and the tuner device across the communication interface, that instructs the tuner device to tune to a RF channel of a broadcast stream, (b) in response to a determination that the RF channel is acquired and is a first predetermined type of signal, (i) send to the information processing apparatus via the API an indication that specifies the signal type of the acquired RF channel as the first predetermined type of signal, (ii) receive a second command, from the information processing apparatus via the API, that instructs the tuner device to (a) identify each physical layer pipe (PLP) in the broadcast stream that includes low level signaling (LLS) tables and (b) send a list including each identified PLP that includes LLS table to the information processing apparatus via the API, and (iii) receive a third command, from the information processing apparatus via the API, that instructs the tuner device to select up to a predetermined number of PLPs from the identified PLPs and send data packets from the selected PLPs to the information processing apparatus.

(15) The tuner device according to feature (14), in which in response to a determination that the RF channel is acquired and the signal type of the acquired RF channel is a second predetermined type of signal, the tuner device is configured to receive a fourth command, from the information processing apparatus via the API, that causes the tuner device to send MPEG-2 Transport Stream (TS) packets to the information processing apparatus.

(16) The tuner device according to feature (15), in which the first predetermined type of signal is an Advanced Television Systems Committee (ATSC) 3.0 signal, and wherein the second predetermined type of signal is not an ATSC 3.0 signal.

(17) The tuner device according to any one of features (14)-(16), in which the communication interface is a Universal Serial Bus (USB) interface.

(18) The tuner device according to any one of features (14)-(17), in which the communication interface is a wireless interface.

(19) A non-transitory computer-readable medium storing instructions, which when executed by a processor in an information processing apparatus, cause the processor to perform a method comprising issuing a first command, via an application programming interface (API) that enables communication between the information processing apparatus and a tuner device across a communication interface, that instructs the tuner device to tune to a RF channel of a broadcast stream, in response to reception of an indication from the tuner device that the RF channel is acquired, and the received indication specifies a signal type of the acquired RF channel is a first predetermined type of signal, (i) issuing a second command, via the API, that instructs the tuner device to identify each physical layer pipe (PLP) in the broadcast stream that includes low level signaling (LLS) tables, (ii) issuing a third command, via the API, that instructs the tuner device to select up to a predetermined number of PLPs from the identified PLPs and send data packets from the selected PLPs to the processing circuitry, and (iii) processing the data packets to retrieve signaling content and content of a television service.

(20) A non-transitory computer-readable medium storing instructions, which when executed by a processor in a tuner device, cause the processor to perform a method comprising receiving a first command from an information processing apparatus, via an application programming interface (API) that enables communication between the information processing apparatus and the tuner device across a communication interface, that instructs the tuner device to tune to a RF channel of a broadcast stream, in response to a determination that the RF channel is acquired and is a first predetermined type of signal, (i) sending to the information processing apparatus via the API an indication that specifies the signal type of the acquired RF channel as the first predetermined type of signal, (ii) receiving a second command, from the information processing apparatus via the API, that instructs the tuner device to (a) identify each physical layer pipe (PLP) in the broadcast stream that includes low level signaling (LLS) tables and (b) send a list including each identified PLP that includes LLS table to the information processing apparatus via the API, and (iii) receiving a third command, from the information processing apparatus via the API, that instructs the tuner device to select up to a predetermined number of PLPs from the identified PLPs and send data packets from the selected PLPs to the information processing apparatus.

The invention claimed is:

1. An information processing apparatus comprising:
a communication interface configured to connect to a plurality of different devices;
processing circuitry configured to, when an external tuner device is connected to the communication interface,
(a) issue a first command, via an application programming interface (API) that enables communication between the processing circuitry and the external tuner device across the communication interface, that instructs the external tuner device to tune to a RF channel of a broadcast stream,
(b) in response to reception of an indication from the external tuner device that the RF channel is acquired, and the received indication specifies a signal type of the acquired RF channel is a first predetermined type of signal,
(i) issue a second command, via the API, that instructs the external tuner device to identify each physical layer pipe (PLP) in the broadcast stream that includes a respective low level signaling (LLS) table,
(ii) issue a third command, via the API, that instructs the external tuner device to select up to a predetermined number of PLPs from the identified PLPs and send data packets from the selected PLPs to the processing circuitry, and
(iii) process the data packets to retrieve signaling content and content of a television service,
wherein in response to a determination that one or more identified PLPs has not been processed, the processing circuitry is further configured to issue a fourth command, via the API, that causes the external tuner device to (i) deactivate the selected PLPs, (ii) select up to a predetermined number of the one or more identified PLPs that have not been processed, and (iii) send data packets from the selected one or more identified PLPs that have not been processed.

2. The information processing apparatus according to claim 1, wherein the data packets from the selected PLPs are link layer packets converted by the external tuner device into UDP/IP packets.

3. The information processing apparatus according to claim 1, wherein the data packets from the selected PLPs are Advanced Television Systems Committee (ATSC) link-layer protocol (ALP) packets, wherein the processing circuitry is further configured to convert the ALP packets to IP packets.

4. The information processing apparatus according to claim 1, wherein the data packets include (i) one or more Service List Tables (SLTs) that specify each IP address associated with a television service included in the broadcast stream, and (ii) one or more Link Mapping Tables (LMTs) that provide a mapping between each IP address specified in the one or more SLTs and one or more PLPs associated with the television service.

5. The information processing apparatus according to claim 4, wherein the processing circuitry is configured to receive the one or more LMTs via an IP packet stream that is separate from a stream containing data packets associated with the television service.

6. The information processing apparatus according to claim 1, wherein in response to a determination that the RF channel is acquired and the signal type of the acquired RF channel is a second predetermined type of signal, the processing circuitry is configured to issue a fourth command, via the API, that causes the information processing apparatus to receive MPEG-2 Transport Stream (TS) packets.

7. The information processing apparatus according to claim 6, wherein the first predetermined type of signal is an Advanced Television Systems Committee (ATSC) 3.0 signal, and wherein the second predetermined type of signal is not an ATSC 3.0 signal.

8. The information processing apparatus according to claim 1, wherein in response to a determination that a record of a past channel scan is available, the processing circuitry is configured to access the record of the past channel scan to determine a last RF channel tuned, and the first command is an instruction for the external tuner device to tune to the determined last RF channel tuned.

9. The information processing apparatus according to claim 8, wherein in response to a determination that the record of the past channel is not available, the first command is an instruction to tune to the lowest available RF channel.

10. The information processing apparatus according to claim 1, wherein the processing circuitry is further configured to, prior to issuing the first command:
determine whether the external tuner device is connected to the communication interface, and
in response to a determination that the external tuner device is not connected to the communication interface, output an appropriate message to a user.

11. The information processing apparatus according to claim 1, wherein the communication interface is a Universal Serial Bus (USB) interface.

12. The information processing apparatus according to claim 1, wherein the communication interface is a wireless interface.

13. An external tuner device comprising:
a communication interface configured to connect to a plurality of different devices;
processing circuitry configured to, when an information processing apparatus is connected to the communication interface,
  (a) receive a first command from the information processing apparatus, via an application programming interface (API) that enables communication between the information processing apparatus and the external tuner device across the communication interface, that instructs the external tuner device to tune to a RF channel of a broadcast stream,
  (b) in response to a determination that the RF channel is acquired and is a first predetermined type of signal,
    (i) send to the information processing apparatus via the API an indication that specifies a signal type of the acquired RF channel as the first predetermined type of signal,
    (ii) receive a second command, from the information processing apparatus via the API, that instructs the external tuner device to (a) identify each physical layer pipe (PLP) in the broadcast stream that includes a respective low level signaling (LLS) table and (b) send a list including each identified PLP that includes the respective LLS table to the information processing apparatus via the API,
    (iii) receive a third command, from the information processing apparatus via the API, that instructs the external tuner device to select up to a predetermined number of PLPs from the identified PLPs and send data packets from the selected PLPs to the information processing apparatus, and
    (iv) receive a fourth command issued by the information processing apparatus via the API based on a determination that one or more identified PLPs has not been processed, the fourth command instructing the external tuner device to (i) deactivate the selected PLPs, (ii) select up to a predetermined number of the one or more identified PLPs that have not been processed, and (iii) send data packets from the selected one or more identified PLPs that have not been processed.

14. The external tuner device according to claim 13, wherein in response to a determination that the RF channel is acquired and the signal type of the acquired RF channel is a second predetermined type of signal, the external tuner device is configured to receive a fourth command, from the information processing apparatus via the API, that causes the external tuner device to send MPEG-2 Transport Stream (TS) packets to the information processing apparatus.

15. The external tuner device according to claim 14, wherein the first predetermined type of signal is an Advanced Television Systems Committee (ATSC) 3.0 signal, and wherein the second predetermined type of signal is not an ATSC 3.0 signal.

16. The external tuner device according to claim 13, wherein the communication interface is a Universal Serial Bus (USB) interface.

17. The external tuner device according to claim 13, wherein the communication interface is a wireless interface.

18. A non-transitory computer-readable medium storing instructions, which when executed by a processor in an information processing apparatus and when a communication interface of the information processing apparatus is connected to an external tuner device, cause the processor to perform a method comprising:
issuing a first command, via an application programming interface (API) that enables communication between the information processing apparatus and the external tuner device across the communication interface configured to connect to a plurality of devices, that instructs the external tuner device to tune to a RF channel of a broadcast stream,
in response to reception of an indication from the external tuner device that the RF channel is acquired, and the received indication specifies a signal type of the acquired RF channel is a first predetermined type of signal,
  (i) issuing a second command, via the API, that instructs the external tuner device to identify each physical layer pipe (PLP) in the broadcast stream that includes a respective low level signaling (LLS) table,
  (ii) issuing a third command, via the API, that instructs the external tuner device to select up to a predetermined number of PLPs from the identified PLPs and send data packets from the selected PLPs to the processor, and
  (iii) processing the data packets to retrieve signaling content and content of a television service,
wherein in response to a determination that one or more identified PLPs has not been processed, the method further includes issuing a fourth command, via the API, that causes the external tuner device to (i) deactivate the selected PLPs, (ii) select up to a predetermined number of the one or more identified PLPs that have not been processed, and (iii) send data packets from the selected one or more identified PLPs that have not been processed.

19. A non-transitory computer-readable medium storing instructions, which when executed by a processor in an external tuner device and when a communication interface of the external tuner device is connected to an information processing apparatus, cause the processor to perform a method comprising:
receiving a first command from the information processing apparatus, via an application programming interface (API) that enables communication between the information processing apparatus and the external tuner device across the communication interface configured to connect to a plurality of different devices, that instructs the external tuner device to tune to a RF channel of a broadcast stream,
in response to a determination that the RF channel is acquired and is a first predetermined type of signal,
  (i) sending to the information processing apparatus via the API an indication that specifies a signal type of the acquired RF channel as the first predetermined type of signal,
  (ii) receiving a second command, from the information processing apparatus via the API, that instructs the external tuner device to (a) identify each physical layer pipe (PLP) in the broadcast stream that includes a respective low level signaling (LLS) table and (b) send a list including each identified PLP that includes the respective LLS table to the information processing apparatus via the API, (iii) receiving a third command, from the information processing apparatus via the API, that instructs the external tuner device to select up to a predetermined number of PLPs from the identified PLPs and send data packets from the selected PLPs to the information processing apparatus, and (iv) receiving a fourth command issued by the information processing apparatus via the API based on a determination that one or more identified PLPs has not been processed, the fourth command instructing the external tuner device to (i) deactivate the selected PLPs, (ii) select up to a predetermined number of the one or more identified PLPs that have not been processed, and (iii) send data packets from the selected one or more identified PLPs that have not been processed.

* * * * *